United States Patent
Olson (10) Patent No.: US 12,286,021 B1
(45) Date of Patent: Apr. 29, 2025

(54) SUSPENDED BATTERY CHARGING STATION

(71) Applicant: Power Tree, LLC, Jupiter, FL (US)

(72) Inventor: Jon Olson, Jupiter, FL (US)

(73) Assignee: Power Tree, LLC, Jupiter, FL (US)

( * ) Notice: Subject to any disclaimer, the term of this patent is extended or adjusted under 35 U.S.C. 154(b) by 567 days.

(21) Appl. No.: 17/706,193

(22) Filed: Mar. 28, 2022

(51) Int. Cl.
| | |
|---|---|
| B60L 53/31 | (2019.01) |
| B60L 53/16 | (2019.01) |
| B60L 53/18 | (2019.01) |
| B60L 53/35 | (2019.01) |

(52) U.S. Cl.
CPC ............. B60L 53/31 (2019.02); B60L 53/16 (2019.02); B60L 53/18 (2019.02); B60L 53/35 (2019.02)

(58) Field of Classification Search
CPC .......... B60L 53/31; B60L 53/16; B60L 53/18; B60L 53/35; B65H 75/446
USPC ........................................................ 320/109
See application file for complete search history.

(56) References Cited

U.S. PATENT DOCUMENTS

| | | |
|---|---|---|
| 4,158,802 A | 6/1979 | Rose |
| 4,450,400 A | 5/1984 | Gwyn |
| 4,983,903 A | 1/1991 | Bae et al. |
| 5,091,687 A | 2/1992 | Meyer et al. |
| 5,306,999 A | 4/1994 | Hoffman |
| 5,323,099 A | 6/1994 | Bruni et al. |
| 5,449,995 A | 9/1995 | Kohchi |
| 5,574,354 A | 11/1996 | Kohchi |
| 6,198,251 B1 | 3/2001 | Landon |
| 8,058,841 B2 | 11/2011 | Chander et al. |
| 8,307,967 B2 | 11/2012 | Patwardhan |
| 8,742,721 B2 | 6/2014 | Hama et al. |
| 9,293,941 B2 | 3/2016 | Takahashi |
| 2010/0259104 A1 | 10/2010 | Winkelman |
| 2012/0175960 A1 | 7/2012 | Winkelman |
| 2014/0070767 A1* | 3/2014 | Morris ............ B60L 5/42 320/109 |
| 2017/0158072 A1* | 6/2017 | Sychov ............ B60L 53/36 |
| 2019/0299801 A1 | 10/2019 | David et al. |
| 2020/0284845 A1 | 9/2020 | Fujita et al. |
| 2020/0369167 A1* | 11/2020 | Krucinski ........... H02J 7/0042 |

* cited by examiner

*Primary Examiner* — Paul Dinh
(74) *Attorney, Agent, or Firm* — Albert Bordas P.A.

(57) ABSTRACT

A suspended battery charging station having a support shaft assembly, an adjustable arm assembly, and an electrical system having at least one battery charger. The support shaft assembly suspends from a ceiling, whereby a junction box is attached to the ceiling and a tube is connected to the junction box. The adjustable arm assembly has an adjustable tube, at least one arm, and at least one platform. The adjustable arm assembly is connected to the support shaft assembly, whereby an upper portion of the adjustable arm assembly is connected to the tube, which extends inside along a rubber sleeve and the adjustable tube. The adjustable arm assembly is placed in an extended and retracted configuration. The platform is mounted onto the arm and the battery charger is secured onto the platform. The battery charger has positive and negative cables having respective booster clamps to provide charge to a battery.

19 Claims, 6 Drawing Sheets

SUSPENDED BATTERY CHARGING STATION

BACKGROUND OF THE INVENTION

1. Field of the Invention

The present invention relates to battery charging stations, and more particularly, to suspended charging stations for golf cart batteries.

2. Description of the Related Art

Applicant believes that one of the closest references corresponds to U.S. Pat. No. 8,742,721 B2 issued to Hama, et al. on Jun. 3, 2014 to for Battery charging warehouse. However, it differs from the present invention because Hama, et al. teach a battery charging warehouse that includes a pallet rack and a battery charger. The pallet rack has a plurality of storage locations in each of which a battery is stored. At least one of the storage locations is a charging storage location in which the battery is charged. The battery charger is mounted to an upper part of the charging storage location. The battery charger is movable up and down in the charging storage location and has a charge connector. When the battery charger is moved down in the charging storage location, the charge connector is received by a battery connector of the battery stored in the charging storage location thereby to automatically connect the charge connector to the battery connector.

Applicant believes that another reference corresponds to U.S. Pat. No. 8,058,841 B2 issued to Bala, et al. on Apr. 29, 2010 for Retractable overhead charging cord dispenser. However, it differs from the present invention because Bala, et al. teach a retractable overhead charging cord dispenser, which has multi-positioning capability to provide plug-in electric power to PHEVs parked at various positions in a garage or the like. An illustrative embodiment of the retractable overhead charging cord dispenser includes an arm assembly, a cord guide arm carried by the arm assembly, a cord storage device provided in the arm assembly and a retractable charging cord extendable from the cord storage device and extending through and protruding from the cord guide arm.

Applicant believes that another reference corresponds to U.S. Pat. No. 5,574,354 issued to Kohchi on Nov. 12, 1996 for Retractable overhead charging cord dispenser. However, it differs from the present invention because Kohchi teaches a retractable overhead charging cord dispenser, which has multi-positioning capability to provide plug-in electric power to PHEVs parked at various positions in a garage or the like. An embodiment of the retractable overhead charging cord dispenser includes an arm assembly, a cord guide arm carried by the arm assembly, a cord storage device provided in the arm assembly and a retractable charging cord extendable from the cord storage device and extending through and protruding from the cord guide arm.

Applicant believes that another reference corresponds to U.S. Pat. No. 5,323,099 issued to Bruni, et al. on Jun. 21, 1994 for Wall/ceiling mounted inductive charger. However, it differs from the present invention because Bruni, et al. teach a weatherized curb-side battery charging system that provides a mechanism for transferring electrical power to an electric vehicle to recharge its battery. The battery charging system includes a housing that is disposed on a wall or is slidably attached to a track mounted to a ceiling, for example the retractable charging device is coupled to a power supply and mates with a receptacle device disposed in the vehicle. A variety of charging devices that may be employed in the battery charging system are disclosed. Electronic circuitry controls power supplied to the vehicle from the power supply of the charging system. In addition, an interface circuit is provided that allows a user to enter a code to use the system and that provides an identification for billing purposes, or a credit card type key that activates the system and performs the same functions. A fan is provided for cooling purposes that causes an air flow through the system. The curb-side charging system thus permits an operator of an electric vehicle to charge its battery in a convenient manner. The battery charging system allows an electric vehicle to be charged safely without any type of conventional electrical plug. The battery charging system provides a safe, convenient and weatherproof mechanism for coupling power from a power source to an electric vehicle to recharge its battery.

Applicant believes that another reference corresponds to U.S. Pat. No. 5,449,995 issued to Kohchi on Sep. 12, 1995 for Battery charging station. However, it differs from the present invention because Kohchi teach a large number of vehicular batteries are charged while riding on gondolas, which go up or down and around in a space-saving tall tower. Charging electricity is distributed along the path of gondola carriages. One or more recharged batteries are removed from the gondolas, which become ready to accept spent batteries. The gondola can be enlarged to accommodate even a battery-loaded vehicle.

Applicant believes that another reference corresponds to U.S. Pat. No. 5,091,687 issued to Meyer, et al. on Feb. 25, 1992 for Apparatus for exchanging and charging of energy storages of transport vehicles. However, it differs from the present invention because Meyer, et al. teach a charging station that includes a circular magazine, which is pivotable about a central axis. Above or beneath the circular magazine, which forms a first disk-shaped partial region of the charging station, there is arranged a second partial region, and specifically a device carrier or support. The latter carries the charging and control devices. In the circular magazine there are a plurality of deposit positions or places for energy storage devices where discharged energy storage devices of transport vehicles are again recharged. A transport carriage with gripper devices serves to displace the energy storage devices from the transport vehicle into the circular magazine and is arranged at the region between the central axis and the periphery of the circular magazine. The exchange and charging apparatus is very compact and space-saving in construction and affords the direct and automatic transfer of energy storage devices between transport vehicles and the charging station.

Applicant believes that another reference corresponds to U.S. Pat. No. 4,983,903 issued to Bae, et al. on Jan. 8, 1991 for Automatic battery exchanging system for automatic guided vehicles. However, it differs from the present invention because Bae, et al. teach an automatic battery exchanging system for use with automatic guided vehicles, which is capable of taking out the battery which is discharged below a threshold voltage of usefulness, mounting the battery to a recharging station, and after charging it, taking it back to the automatic guided vehicle so that the automatic guided vehicle may return to normal operation. This is completed under the control of a control unit.

Applicant believes that another reference corresponds to U.S. Pat. No. 4,450,400 issued to Gwyn on May 22, 1984 for Battery replacement system for electric vehicles. However, it differs from the present invention because Gwyn teaches a system for replacing electrical batteries in electrically powered vehicles in a minimum period of time on the order of one minute or less. Carriage-elevator structure is arranged in front of a battery charging station to transfer selected batteries between the charging station and a parked stationary vehicle. The vehicle and the charging station are provided with roller support units adapted to bear the battery weight and permit manual push- and/or pull shift of individual batteries to or from the aforementioned elevator. The system enables a substantially discharged battery to be removed from a vehicle and replaced with a fully charged battery in a very short time, e.g. about one minute.

Applicant believes that another reference corresponds to U.S. Pat. No. 4,158,802 issued to William Rose on Jun. 19, 1979 for Rechargeable battery powered electric car and recharging station therefor. However, it differs from the present invention because Rose teaches a rechargeable battery powered electric vehicle comprising an electric motor powered by a rechargeable storage battery in combination with a recharging station comprising extendible electrodes for supplying recharging power for the vehicle's storage battery, said vehicle comprising a charging circuit connected to said battery with one lead grounded to the vehicle body and one lead connected to a selected portion of an outer surface of the vehicle, said extendible electrodes being positioned in a charging station to extend toward said vehicle with one electrode in contact with the grounded portion of the vehicle and another electrode in contact with the insulated surface connected to said vehicle battery whereby when the vehicle is within reach of the electrodes they make desired contact between the power station and the battery and when the vehicle is moved away from the electrodes the charging connection is broken.

Applicant believes that another reference corresponds to U.S. Pat. No. 5,306,999 issued to Hoffman on Apr. 26, 1994 for Electric vehicle charging station. However, it differs from the present invention because Hoffman teaches an electric vehicle charging station that has a base unit with a control box electrically coupled to an electrical power line, and a retractable support arm assembly with an electrical conductor and an electrical connector coupled thereto for movement between a retracted position and an extended position. The support arm assembly includes various support arms and/or linkages, which provide limited degrees of vertical movement and horizontal movement.

Applicant believes that another reference corresponds to U.S. Pat. No. 6,198,251 B1 issued to Frank L. Landon on Mar. 3, 2001 for Method for sequentially charging batteries in situ. However, it differs from the present invention because Landon teaches a plurality of batteries located in battery-operated devices by a charger through a distributor where there is no communication between the distributor and the batteries in the battery operated devices are charged in automated sequence in situ by a charger through a distributor where there is no communication between the distributor and the batteries, preferably using pulsed charge technology.

Applicant believes that another reference corresponds to U.S. Pat. No. 8,307,967 B1 issued to Patwardhan on Nov. 13, 2012 for Widely deployable charging system for vehicles. However, it differs from the present invention because Patwardhan teaches a mechanical, electrical and telecommunication system to electrically connect a vehicle to an electricity source to transfer energy to the vehicle. In one rendition the system has a stationary portion on the road or infrastructure side, and a moving member on the vehicle. The system is designed to tolerate misalignments of a parked vehicle with respect to the parking stall. The infrastructure or road side component of the system being mechanically static is designed rugged and therefore is widely deployable. The system along with moving member is fail-safe and poses no threat to humans, the vehicle being charged or the vehicles sharing the road. An important component of the system is a pair of rigid, insulating strips with a series of conductors on each of them, placed at approximately right angles to each other. One of the strips is mounted on the infrastructure or road side and the other on the vehicle. The two strips cover the lateral and longitudinal misalignment of the parked vehicle. As long as the two strips have an overlap, the connection can be made by the conductors in the overlap region. The system is designed to operate only in the active presence and active desire of a vehicle to connect to the infrastructure or road side stationary part.

Applicant believes that another reference corresponds to U.S. Pat. No. 9,293,941 B1 issued to Sachio Takahashi on Mar. 22, 2016 for Charger and charging apparatus. However, it differs from the present invention because Takahashi teaches a charger, which charges a rechargeable battery, comprising a first output unit which outputs a first voltage; a second output unit which outputs a second voltage having a predetermined voltage value different from that of the first voltage; a charge control unit, which inputs the first voltage and the second voltage, alternately outputs these voltages, and supplies them to the rechargeable battery as charging voltages; a charged-amount detection unit, which measures a charged amount of the rechargeable battery; and an output control unit, which carries out control in such a manner that an output time of the first voltage and/or the second voltage in the charge control unit is prolonged as the charged amount increases.

Applicant believes that another reference corresponds to U.S. Patent Application Publication No. 2019/0299801 A1, published on Oct. 3, 2019 to David R., et al. for Overhead Programmable Battery Charger. However, it differs from the present invention because David R., et al. teach a overhead battery charger that includes a source of electric power, for example an electrical outlet, as well as a power cord connected to the source of electric power. At least one battery connection device, such as alligator clamps, is attached to the power cord, and a controller adapted to adjust voltage, current, or both, is available at the battery connection device. In addition, a remote device, such as a smart phone, tablet, or computer, runs an app and sends signals to direct the adjustments made by the controller.

Applicant believes that another reference corresponds to U.S. Patent Application Publication No. 2012/0175960 A1, published on Jul. 12, 2012 to Robert Winkelman for Battery Management System and Method. However, it differs from the present invention because Winkelman teaches a battery management system for use in multi-battery and/or multi-cell applications, including a wiring harness for connecting a plurality of batteries in an order having at least two end positions and at least one interior position, with each position being initially occupied by one of the batteries, and an interconnection mechanism connected to the harness and configured to modify the positions occupied by the batteries. The mechanism may be configured to measure a voltage of each battery and modify the positions when a voltage difference is detected. Alternatively, the mechanism may be configured to modify the positions each time a voltage drop is detected. The order may further comprise at least one out-of-service position, with the mechanism being configured to modify the positions such that the battery in the out-of-service position and at least one of the batteries in one of the end positions are reconnected to exchange positions.

Applicant believes that another reference corresponds to U.S. Patent Application Publication No. 2010/0259104 A1, published on Oct. 14, 2010 to Robert Winkelman for Battery management system. However, it differs from the present invention because Winkelman teaches a battery management system for use in multi-battery and/or multi-cell applications. The system comprises a wiring harness for connecting a plurality of batteries in an order having at least two end positions and at least one interior position, with each position being initially occupied by one of the batteries, and an interconnection mechanism connected to the harness and configured to modify the positions occupied by the batteries. The mechanism may be configured to measure a voltage of each battery and modify the positions when a voltage difference is detected. Alternatively, the mechanism may be configured to modify the positions each time a voltage drop is detected. The order may further comprise at least one out-of-service position, with the mechanism being configured to modify the positions such that the battery in the out-of-service position and at least one of the batteries in one of the end positions are reconnected to exchange positions.

Applicant believes that another reference corresponds to U.S. Patent Application Publication No. 2020/0284845 A1, published on Sep. 10, 2020 to Fujita, et al. for Battery charger, charging method, non-transitory storage medium, and battery provision system. However, it differs from the present invention because Fujita, et al. teach a battery charger that includes a charger/discharger, a measurer, an estimator, a determinator, and an outputter. The charger/discharger can charge and discharge a connected battery. The measurer measures a voltage and current of the battery during charging and generates measurement data. The estimator estimates a deterioration state of the battery on the basis of the measurement data. The determinator determines whether or not the battery is usable, on the basis of the estimated deterioration state of the battery. The outputter outputs information about the determination as to whether or not the battery is usable.

Other patents describing the closest subject matter provide for a number of more or less complicated features that fail to solve the problem in an efficient and economical way. None of these patents suggest the novel features of the present invention.

SUMMARY OF THE INVENTION

The present invention is a suspended battery charging station, comprising a support shaft assembly, an adjustable arm assembly, and an electrical system having at least one battery charger. The adjustable arm assembly is connected to the support shaft assembly.

The support shaft assembly comprises a tube, a junction box, charging indicators, a power indicator, and a polyvinyl shaft defining cavities. The support shaft assembly suspends from a ceiling, whereby the junction box is attached to the ceiling and the tube is connected to the junction box. The adjustable arm assembly comprises an adjustable tube, at least one arm, and at least one platform. The adjustable arm assembly further comprises an upper portion, a spring, a rubber sleeve, a top end, a bottom end, a handle having a grip, a serrated edge, a release button, and a height adjustment mechanism. The adjustable arm assembly is mounted to the tube, whereby the upper portion is connected to the tube and the tube extend inside along the rubber sleeve and the adjustable tube. The rubber sleeve is connected to the upper portion and to the adjustable tube and the handle is connected to the bottom end. The adjustable arm assembly may be placed into an extended configuration and a retracted configuration.

The at least one arm comprises a tab, a distal end, and a proximal end. The proximal end is attached to the adjustable tube. The at least one platform is mounted onto the at least one arm. The at least one platform is mounted onto the at least one arm on the distal end. The at least one platform is mounted onto the at least one arm on the distal end defining a predetermined angle of approximately between 6 and 12 degrees. The at least one battery charger is secured onto the at least one platform. The height adjusting mechanism is coupled to the serrated edge at different heights to place the adjustable arm assembly in a desired position.

The electrical system further comprises at least one lead, at least one power cord having respective connector, and at least one outlet. In a preferred embodiment, the at least one lead is made of copper. The at least one outlet is fixed to the adjustable tube aligning to the at least one arm. The at least one lead extends from the ceiling through the junction box and the tube to connect with the at least one outlet. The at least one power cord is connected to the battery charger. The at least one battery charger comprises positive and negative cables having respective booster clamps to provide charge to a battery. The at least one power cord is connected to the at least one outlet and the booster clamps are connected to respective positive and negative poles of the battery to charge the battery. When the battery is completely charged, the at least one power cord is disconnected from the at least one outlet and the booster clamps are hooked on the tab of the at least one arm.

It is therefore one of the main objects of the present invention to provide a suspended battery charging station.

It is another object of this invention to provide a suspended battery charging station, which suspend from a ceiling.

It is another object of this invention to provide a suspended battery charging station having at least one arm with a platform, which secures a battery charger to charge a battery.

It is another object of this invention to provide a suspended battery charging station, which is extendable and retractable.

It is another object of this invention to provide a suspended battery charging station to charge golf cart batteries.

It is another object of this invention to provide a suspended battery charging station that can be readily assembled and disassembled without the need of any special tools.

It is another object of this invention to provide a suspended battery charging station, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, the present invention is a suspended battery charging station, and is generally referred to with numeral 10. It can be observed that it basically includes support shaft assembly 20, adjustable arm assembly 40, and electrical system 80.

Figure 1:
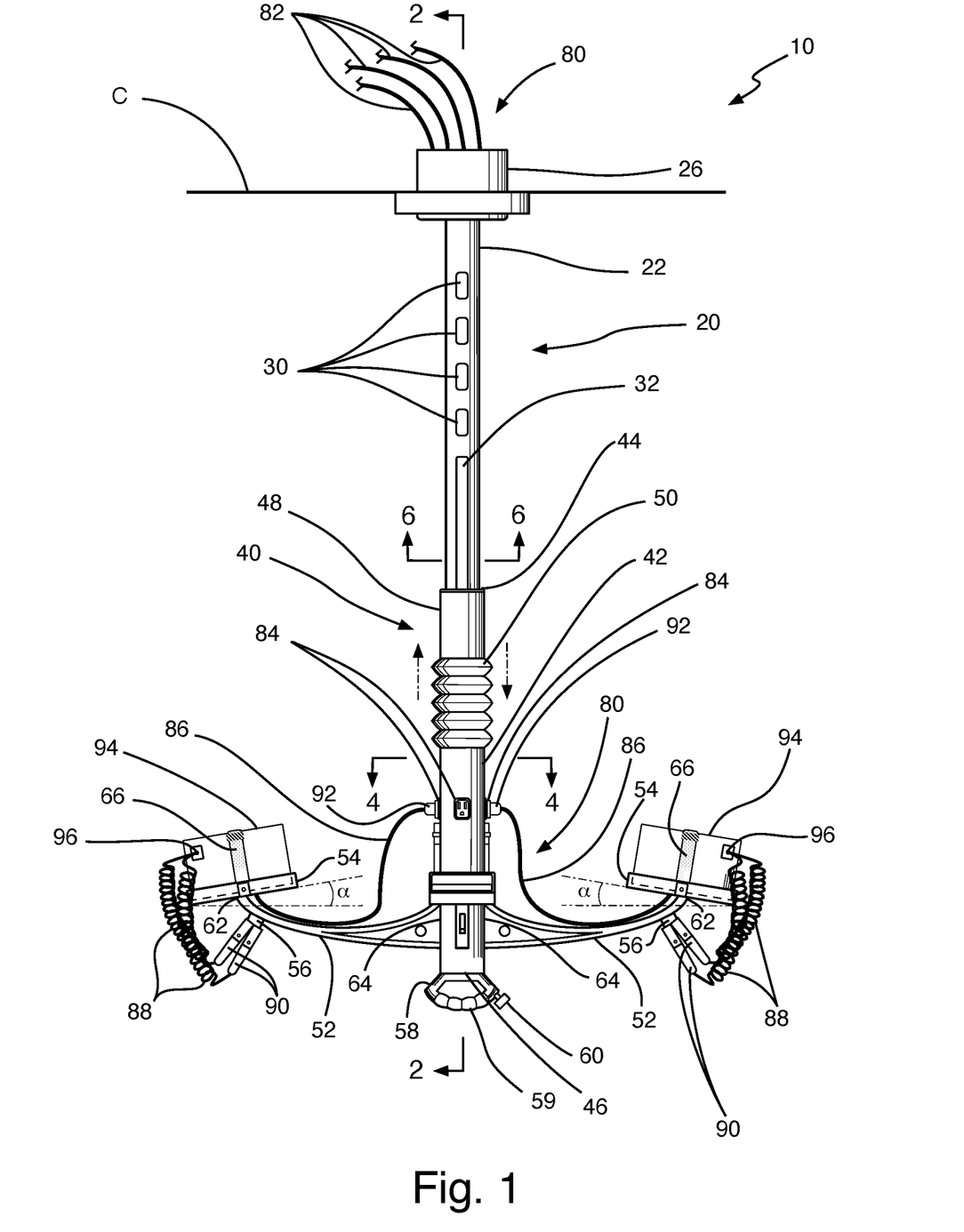
FIG. 1 is a front view of the present invention.
Figure 2:
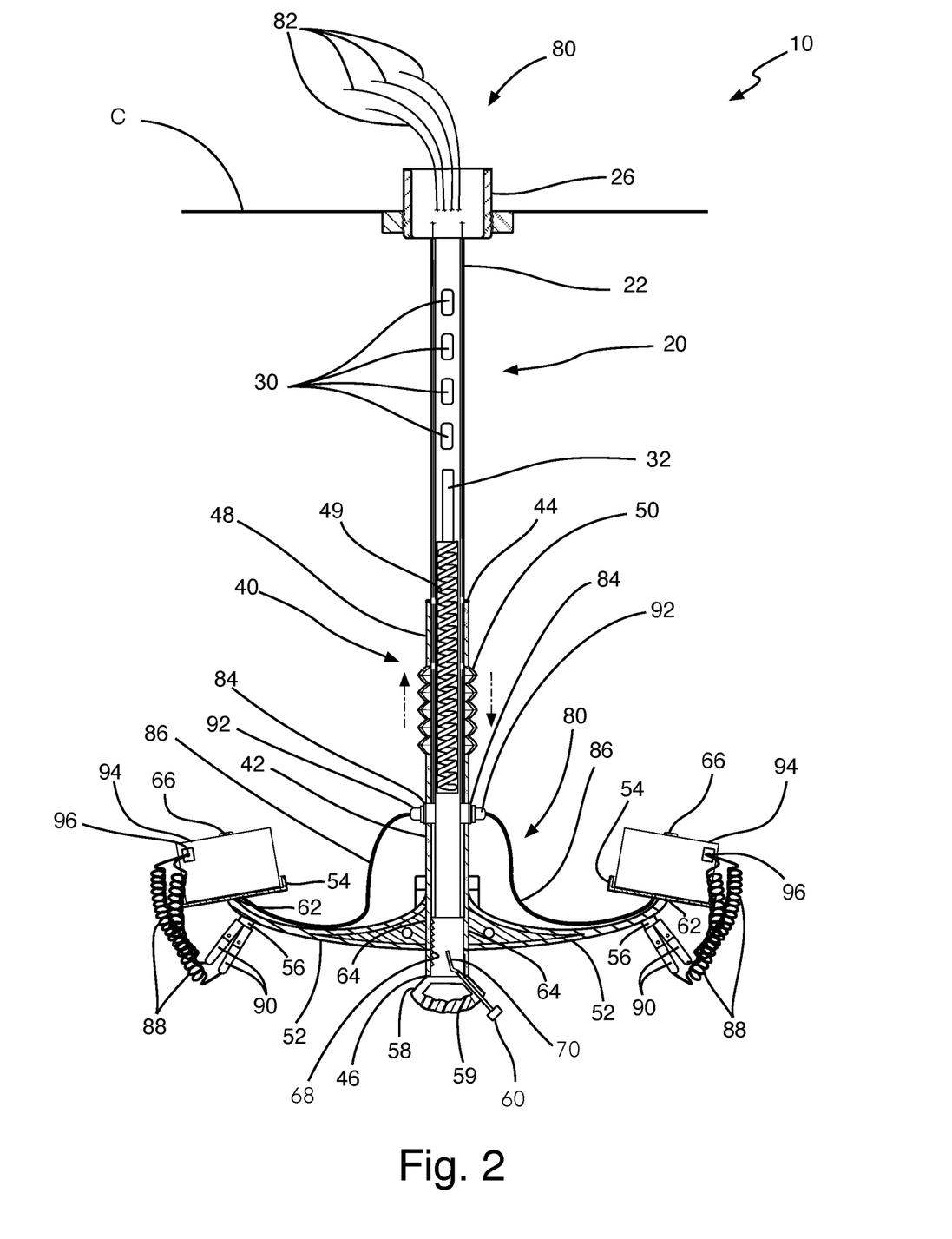
FIG. 2 is a cut view of the present invention taken along lines 2-2 from FIG. 1.

As seen in FIGS. 1 and 2, adjustable arm assembly 40 is mounted onto support shaft assembly 20. Support shaft assembly 20 comprises tube 22, junction box 26, charging indicators 30, and power indicator 32. Support shaft assembly 20 suspends from ceiling C, whereby junction box 26 is attached to ceiling C, and tube 22 is connected and extends from junction box 26. Charging indicators 30 and power indicator 32 are positioned along tube 22. Adjustable arm assembly 40 comprises adjustable tube 42, upper portion 48, spring 49, rubber sleeve 50, at least one arm 52, and at least one platform 54. In a preferred embodiment, at least one arm 52 is curved. Each platform 54 is mounted onto a respective arm 52, and each platform 54 receives battery charger 94. In a preferred embodiment, platforms 54 are coated with a vinyl diamond plate. Power indicator 32 indicates a charge level of a corresponding battery charger 94.

Adjustable arm assembly 40 further comprises top end 44, bottom end 46, handle 58 having grip 59, release button 60, serrated edge 68, and height adjustment mechanism 70. Adjustable arm assembly 40 is mounted to tube 22, whereby upper portion 48 is mounted onto tube 22, and tube 22 extends inside along rubber sleeve 50 and adjustable tube 42. Rubber sleeve 50 is connected to upper portion 48 and to adjustable tube 42, and handle 58 is connected to bottom end 46. At least one arm 52 comprises tab 56, distal end 62, and proximal end 64. Proximal end 64 is attached to adjustable tube 42. Each platform 54 is mounted onto a respective arm 52 at a distal end 62 to define a predetermined angle x. In a preferred embodiment, angle α is approximately between 6 and 12 degrees. In a more preferred embodiment, angle α is approximately 9 degrees. Battery charger 94 is secured onto platform 54. Adjustable arm assembly 40 further comprises straps 66 to secure each battery charger 94 onto its respective platform 54.

Electrical system 80 comprises at least one battery charger 94, at least one lead 82, at least one outlet 84, and at least one power cord 86 having a respective connector 92. Outlet 84 is fixed to adjustable tube 42 and aligns with its arm 52. In a preferred embodiment, at least one lead 82 is made of copper. Leads 82 extend from ceiling C through junction box 26 and tube 22 to connect with respective outlets 84. Each power cord 86 is connected to its respective battery charger 94. In a preferred embodiment, leads 82 extend from ceiling C through respective cavities 34, seen in FIG. 6, to connect with respective outlets 84. Each battery charger 94 comprises positive and negative cables 88 having respective booster clamps 90. Positive and negative cables 88 are connected to cable connection 96. In a preferred embodiment, positive and negative cables 88 are coiled cables.

As seen in FIG. 2, adjustable arm assembly 40 is in a retracted (upward) configuration.

Figure 3:
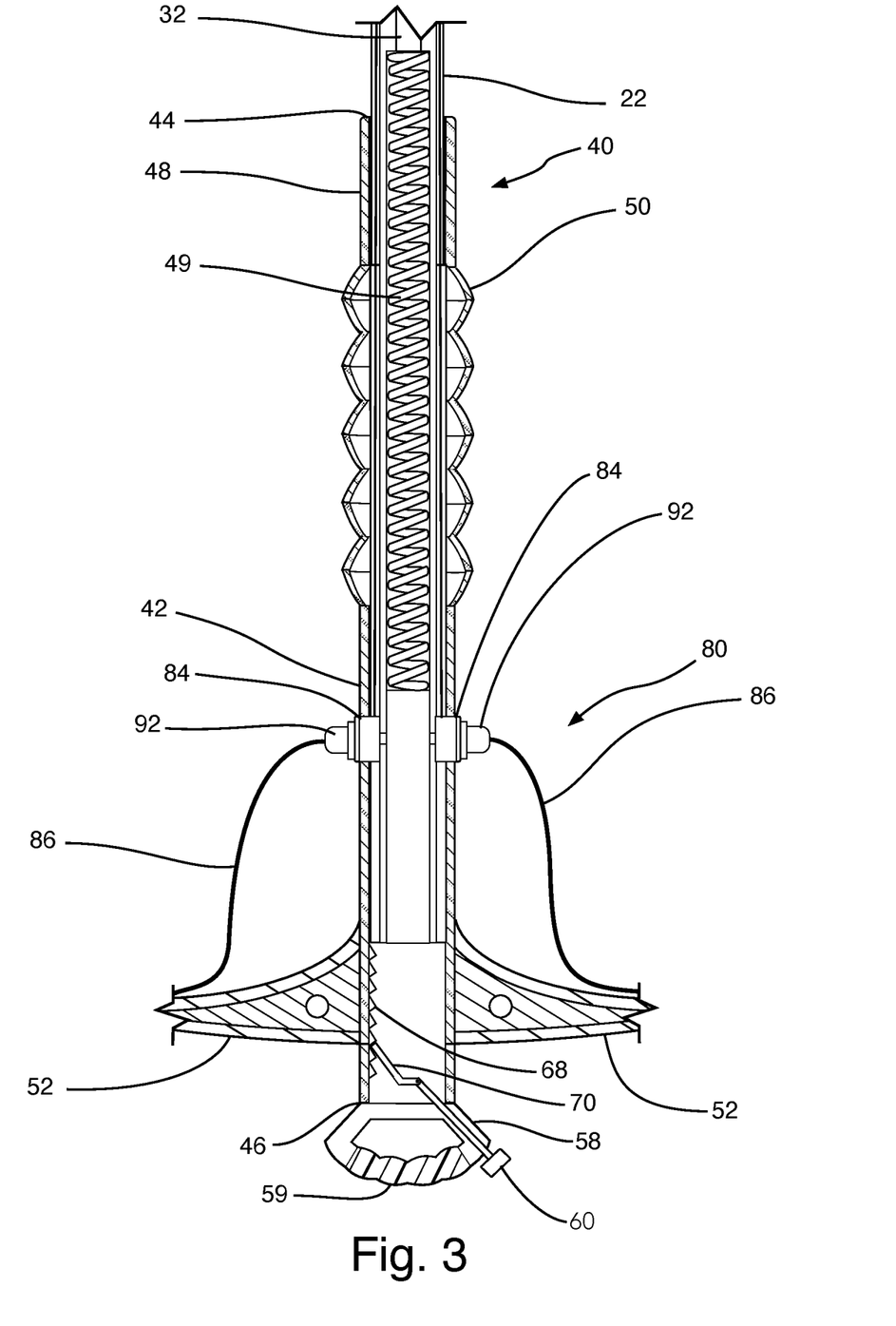
FIG. 3 is an enlarged partial cross-section view, showing an adjustable arm assembly in an extended configuration.

As seen in FIG. 3, adjustable arm assembly 40 is in an extended (downward) configuration, whereby spring 49 is a pre-tensioned spring for height adjustment. More specifically, spring 49 has a predetermined resistance to extend adjustable tube 42 downwardly when a predetermined force is applied. Adjustable arm assembly 40 is moved downwardly and upwardly with handle 58 to a desired height. Height adjusting mechanism 70 is coupled to serrated edge 68 at different heights to place adjustable arm assembly 40 in a desired position.

Figure 4:
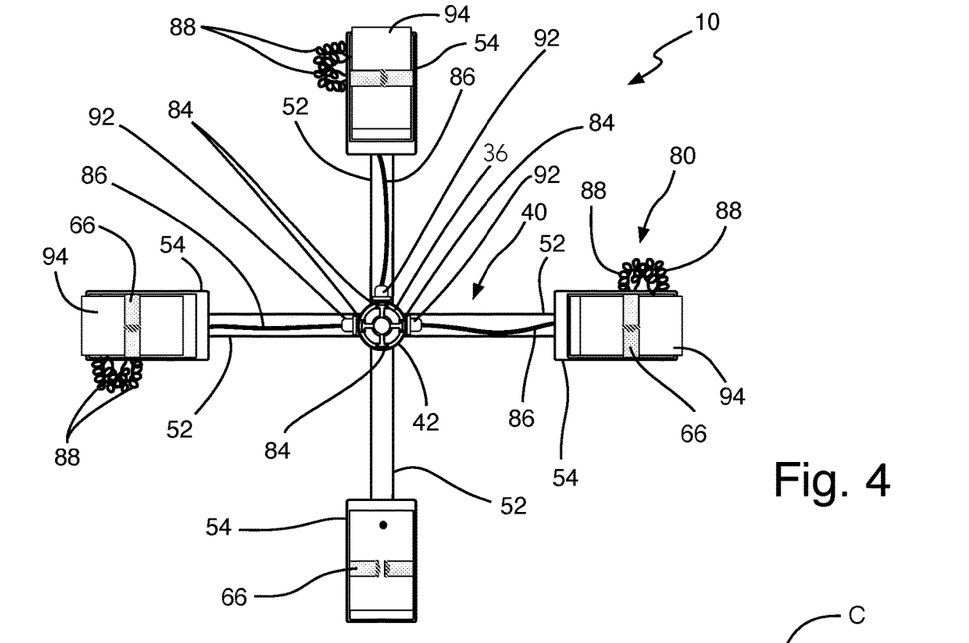
FIG. 4 is a cut view of the present invention taken along lines 4-4 from FIG. 1.
Figure 5:
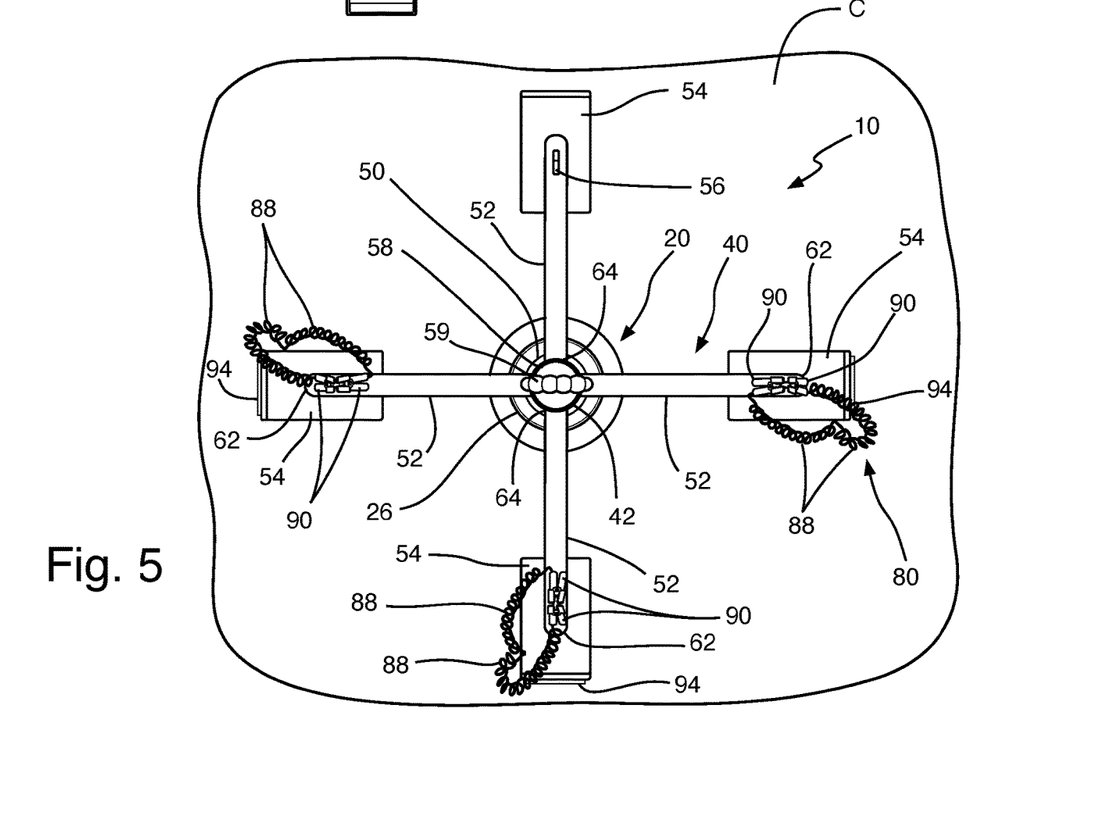
FIG. 5 is a bottom view of the present invention.

As seen in FIGS. 4 and 5, in a preferred embodiment, adjustable arm assembly 40 comprises four arms 52 having four respective platforms 54, each having a respective battery charger 94 mounted thereon. Arms 52 are connected to adjustable tube 42 separated approximately 90 degrees from each other. Arms 52 are mounted on a same plane around adjustable tube 42 at respective proximal ends 64. In a preferred embodiment, electrical system 80 comprises four leads 82, seen in FIG. 1, four power cords 86, and four outlets 84. Outlets 84 are fixed to adjustable tube 42 and are separated approximately 90 degrees from each other, and therefore align with their respective arms 52.

Figure 6:
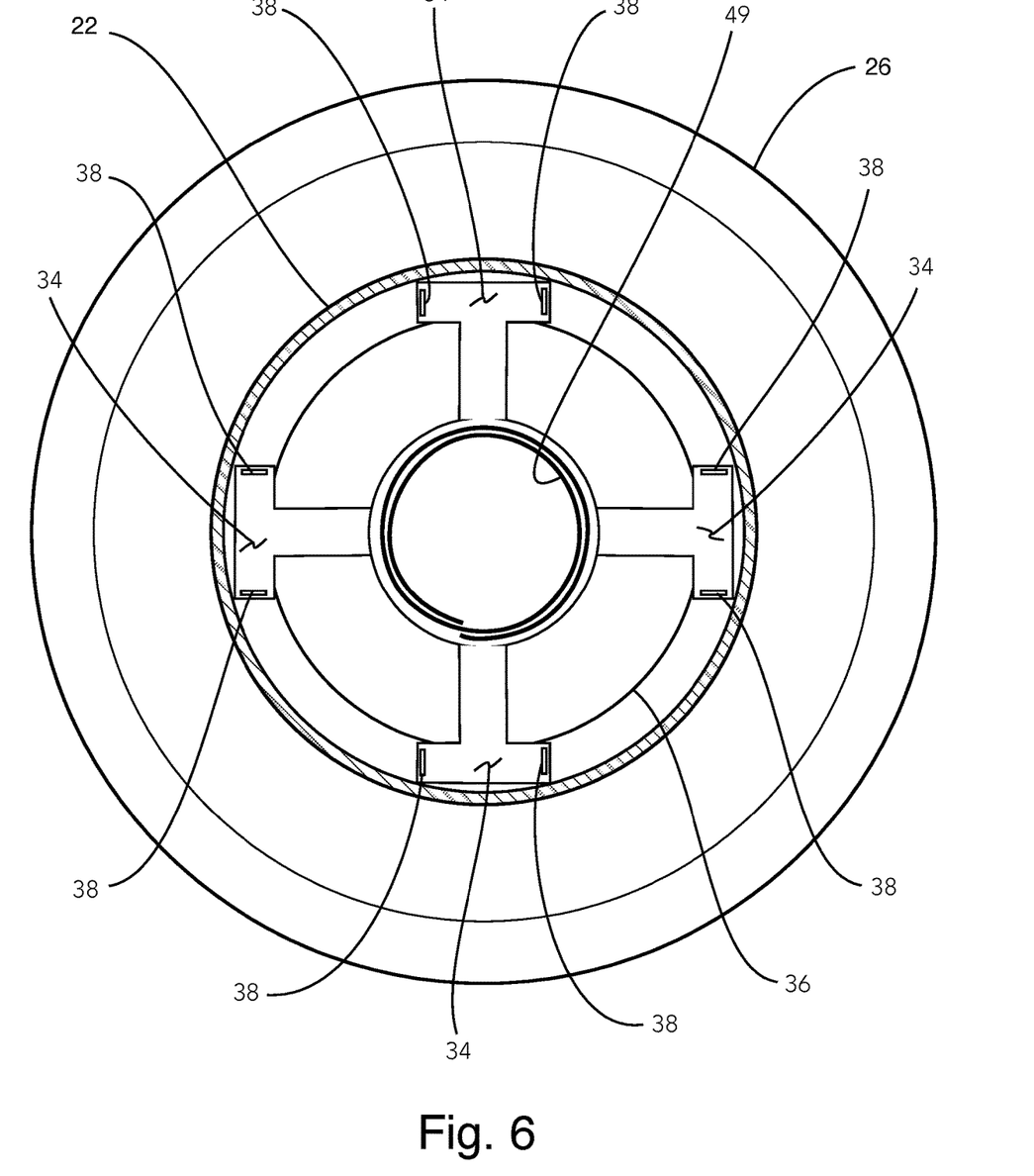
FIG. 6 is a cut view of the present invention taken along lines 6-6 from FIG. 1.

As seen in FIG. 6, tube 22 comprises polyvinyl shaft 36 defining cavities 34. Cavities 34 comprise plates 38. In a preferred embodiment, plates 38 are made of copper. Leads 82, seen in FIG. 1, extend within each respective cavity 34. In a preferred embodiment, cavities 34 are T-shaped.

Figure 7:
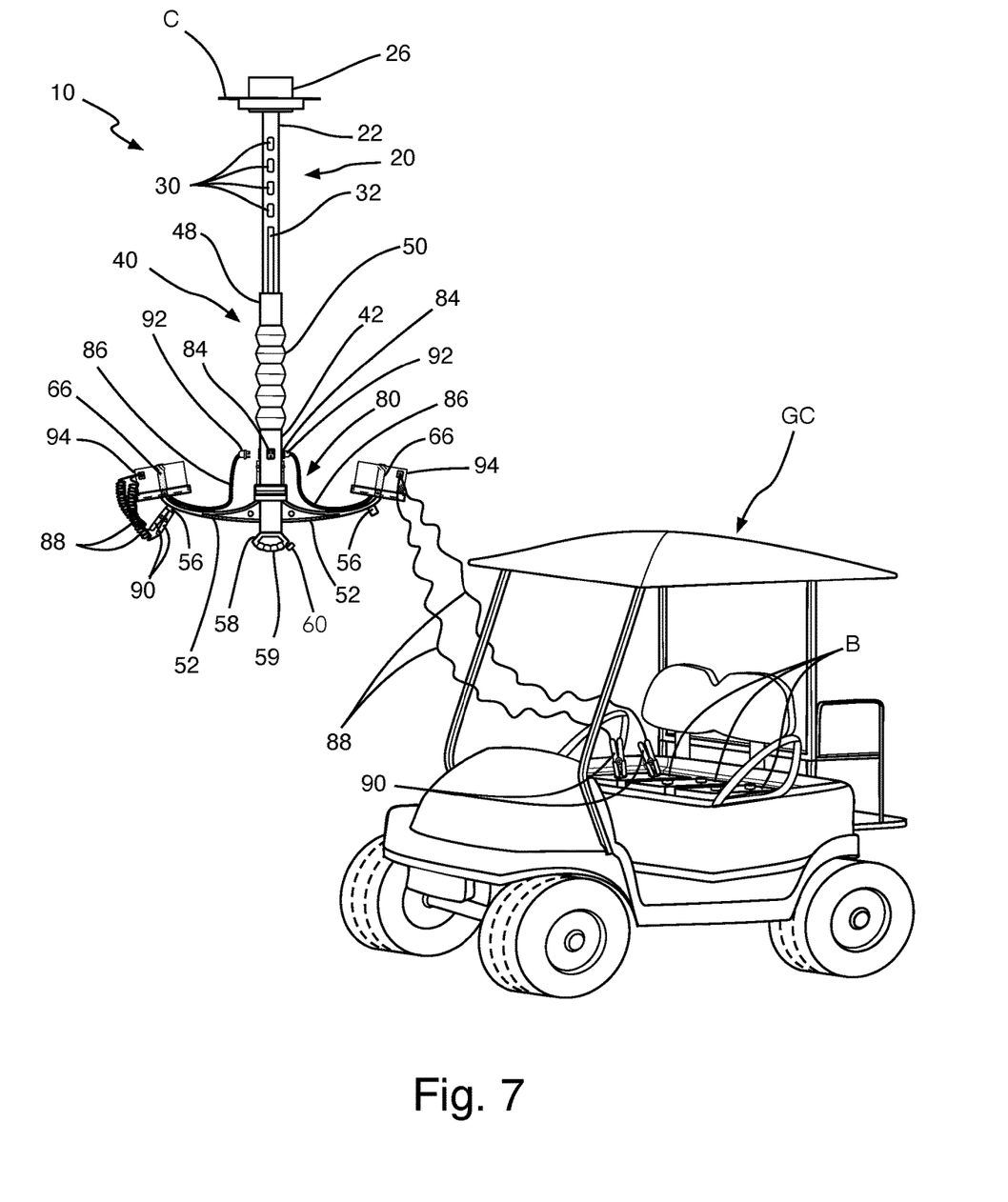
FIG. 7 is a representation of the present invention in use.

As seen in FIG. 7, at least one battery charger 94 provides charge to battery B. In a preferred embodiment, present invention 10 is used on golf carts GC. For charging battery B, power cord 86 is connected to a respective outlet 84 and booster clamps 90 are connected to respective positive and negative poles of battery B. When battery B is completely charged, power cord 86 is disconnected from outlet 84 and booster clamps 90 are hooked on tabs 56 of respective arms 52. Charging indicators 30 indicate a charge level for each battery B. In a preferred embodiment, there are four sets of charging indicators 30, each aligning with a respective arm 52 and battery charger 94 to indicate the charge level for the corresponding battery B.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A suspended battery charging station, comprising:
    A) a support shaft assembly comprising a tube, a junction box, charging indicators, a power indicator, and a polyvinyl shaft defining cavities;
    B) an adjustable arm assembly having an adjustable tube, at least one arm, and at least one platform; and
    C) an electrical system having at least one battery charger, said adjustable arm assembly is mounted to said support shaft assembly.

2. The suspended battery charging station set forth in claim 1, wherein said support shaft assembly suspends from a ceiling, whereby said junction box is attached to said ceiling and said tube is connected to said junction box.

3. The suspended battery charging station set forth in claim 2, wherein said at least one arm comprises a tab, a distal end, and a proximal end.

4. The suspended battery charging station set forth in claim 3, wherein said proximal end is attached to said adjustable tube.

5. The suspended battery charging station set forth in claim 3, wherein said at least one platform is mounted onto said at least one arm on said distal end.

6. The suspended battery charging station set forth in claim 3, wherein said at least one platform is mounted onto said at least one arm on said distal end defining a predetermined angle of approximately between 6 and 12 degrees.

7. The suspended battery charging station set forth in claim 3, wherein said electrical system further comprises at least one lead, at least one power cord having respective connector, and at least one outlet.

8. The suspended battery charging station set forth in claim 7, wherein said at least one outlet is fixed to said adjustable tube and aligns with a respective said at least one arm.

9. The suspended battery charging station set forth in claim 7, wherein said at least one lead extends from said ceiling through said junction box and said tube to connect with said at least one outlet.

10. The suspended battery charging station set forth in claim 7, wherein said at least one power cord is connected to said battery charger.

11. The suspended battery charging station set forth in claim 7, wherein said at least one battery charger comprises positive and negative cables having respective booster clamps to provide charge to a battery.

12. The suspended battery charging station set forth in claim 11, wherein said at least one power cord is connected to said at least one outlet and said booster clamps are connected to respective positive and negative poles of said battery to charge said battery.

13. The suspended battery charging station set forth in claim 1, wherein said adjustable arm assembly further comprises an upper portion, a spring, a rubber sleeve, a top end, a bottom end, a handle having a grip, a serrated edge, a release button, and a height adjustment mechanism.

14. The suspended battery charging station set forth in claim 13, wherein said adjustable arm assembly is mounted to said tube, whereby said upper portion is connected to said tube and said tube extends inside along said rubber sleeve and said adjustable tube.

15. The suspended battery charging station set forth in claim 13, wherein said rubber sleeve is connected to said upper portion and to said adjustable tube, and said handle is connected to said bottom end.

16. The suspended battery charging station set forth in claim 13, wherein said height adjusting mechanism is coupled to said serrated edge at different heights to place said adjustable arm assembly in a desired position.

17. The suspended battery charging station set forth in claim 1, wherein said adjustable arm assembly is placed into an extended configuration and a retracted configuration.

18. The suspended battery charging station set forth in claim 1, wherein said at least one platform is mounted onto said at least one arm.

19. The suspended battery charging station set forth in claim 1, wherein said at least one battery charger is secured onto a respective said at least one platform.

* * * * *